(12) United States Patent
Martin

(10) Patent No.: US 6,788,515 B1
(45) Date of Patent: Sep. 7, 2004

(54) OVER-CURRENT CONTROL

(75) Inventor: Donald R. Martin, New Lenox, IL (US)

(73) Assignee: G&W Electric Co., Blue Island, IL (US)

( * ) Notice: Subject to any disclaimer, the term of this patent is extended or adjusted under 35 U.S.C. 154(b) by 353 days.

(21) Appl. No.: 09/951,696

(22) Filed: Sep. 13, 2001

(51) Int. Cl.⁷ .............................................. H02H 5/04
(52) U.S. Cl. ...................................... 361/103; 361/104
(58) Field of Search ........................ 361/87, 91.1, 91.3, 361/93.1, 93.6, 40, 41, 42, 43, 44, 103, 104, 105, 106

(56) References Cited

U.S. PATENT DOCUMENTS

| | | |
|---|---|---|
| 3,181,032 A | 4/1965 | Myers |
| 3,213,323 A | 10/1965 | Circle |
| 3,307,075 A | 2/1967 | Park |
| 3,465,208 A | 9/1969 | Patrickson et al. |
| 3,467,890 A | 9/1969 | Mayer |
| 4,255,669 A | 3/1981 | Naugle |
| 4,442,471 A | 4/1984 | Trayer |
| 4,513,343 A | 4/1985 | Ryczek |
| 5,247,419 A | 9/1993 | Grundmann |
| 5,541,803 A * | 7/1996 | Pope et al. ............... 361/103 |
| 5,723,916 A | 3/1998 | Disney et al. |
| 5,729,418 A | 3/1998 | Lei |
| 5,825,602 A | 10/1998 | Tosaka et al. |
| 5,864,458 A * | 1/1999 | Duffy et al. ............. 361/93.9 |
| 5,892,644 A | 4/1999 | Evans et al. |
| 5,946,179 A | 8/1999 | Fleege et al. |
| 5,956,222 A | 9/1999 | Wittner et al. |
| 6,002,565 A | 12/1999 | Rönisch |
| 6,025,980 A * | 2/2000 | Morron et al. ............. 361/42 |
| 6,067,217 A | 5/2000 | Kida et al. |
| 6,104,583 A * | 8/2000 | Wynn et al. ................. 361/7 |

* cited by examiner

Primary Examiner—Stephen W. Jackson
Assistant Examiner—Danny Nguyen
(74) Attorney, Agent, or Firm—Michael Best & Friedrich LLP

(57) ABSTRACT

An over-current control device, either single or three phased, is provided for protecting equipment and persons under fault conditions. The control device incorporates integrated circuitry to provide over-current protection to monitored circuits/components. The preferred embodiments of the device include time/current characteristic circuitry and trip circuitry to cause the contacts of a relay to transition, thereby actuating a magnetic latch and providing either direct or indirect over-current control.

4 Claims, 2 Drawing Sheets

OVER-CURRENT CONTROL

FIELD OF THE INVENTION

This invention relates to over-current controls and, more particularly, to an over-current control which uses integrated circuitry to protect equipment from being damaged during fault or overload conditions.

BACKGROUND OF THE INVENTION

Electrical systems in residential, commercial and industrial applications often include a panel board for receiving electrical power from a utility source. The power is routed (or distributed) through protection devices to designated branch circuits that go supply one or more loads. These protection devices are typically circuit interrupters such as circuit breakers and fuses that are designed to interrupt the electrical circuit if the limits of the conductors supplying the loads are surpassed.

Fuses provide protection by incorporating within them an element that melts under the application of sufficient current, thus providing a break in the circuit. The break in the circuit acts to stop the flow of current in the circuit, thereby protecting equipment and persons from harm caused by the abnormal situation. The historical advantage of fuses has been their relatively low-cost and simple installation and use. However, fuses are inherently limited by their one-time use characteristic. Once a fuse has "blown," with relatively few exceptions, the fuse must be replaced for the circuit to function in the future.

Circuit breakers, because of their ability to be reset and reused, are a preferred type of circuit interrupter. Circuit breakers are designed to trip open and interrupt an electrical circuit in response to short circuits and overload conditions. Short circuit protection in a circuit breaker is provided by an electromagnetic element that trips when sensing abnormally high current flow in the circuit. The elevated current level causes a high magnetic flux field around a yoke to draw a magnetic armature toward the yoke. The magnetically drawn armature rotates about a pivot and a trip lever, is released from its engagement with the armature. The release and movement of the trip lever causes moveable contacts to separate, thereby interrupting the electrical circuit.

Overload protection in a circuit breaker is provided by a thermal bimetal element that will bend when heated by increased current, causing the circuit breaker to trip and interrupt the power. This can occur when too many loads draw power from the same branch circuit at the same time, or when a single load draws more power than the branch circuit is designed to carry. The bimetal is composed of two dissimilar metals which are laminated or bonded together and which expand at different rates due to temperature increase, thereby causing the bimetal to bend. The yoke and armature described in relation to short circuit tripping, supra, are connected to the bimetal, so that the yoke and armature are carried with the bimetal as it bends. As described above in connection with short circuit tripping, this causes the armature to release its engagement of the trip lever, thereby causing the movable contacts to open and interrupt the electrical circuit.

Thermal current sensing mechanisms have a wide range on their tolerance and are only useful in applications where the coordination of the operation of the circuit breaker is not critical to the rest of the electrical system. These mechanisms also have to be insulated for the full operating voltage of the device since they operate at system voltage. The application of these devices is typically restricted to levels of 1000 volts and below.

Electronic current sensing circuits are applied on both distribution (15–38 kv) and transmission systems (69 kV and above). The electronic circuits are insulated from the high voltage through the current transformer. Electronic current sensing circuits typically have a large number of user configurable settings allowing them to be applied in many diverse application.

There are many applications on distribution systems where it would be desirable to replace older fuse technology with newer circuit breaker technology. In these allocations the large number of settings provided by present electronic controls is not an advantage since the application does not require sophisticated coordination schemes. Also, the cost of the present electronic controls ranges from several hundred dollars to several thousand dollars, depending on the sophistication of the control, which makes the replacement of the older technology cost prohibitive.

It would be desirable for these applications where older fuse technology could be replaced with newer circuit breaker technology to have a cost-effective control which has a limited range of settings to meet the needs of the application. The low-cost control described below provides such a device. The cost of the control described below is in the tens of dollars per phase and provides the necessary settings for fuse replacement applications.

BRIEF SUMMARY OF THE INVENTION

An object of the present invention is to use solid state components in an over-current control to mimic the time response characteristics of a fuse.

Another object of the present invention is to provide self-protection circuitry to prevent damage to the over-current device itself.

Still another object is to reduce the cost of over-current control by incorporating integrated circuitry.

A further objective of the present invention is to enhance the accuracy of the over-current control by providing a means of fine-tuning the over-current trip point.

The present invention is a low-cost over-current control device for providing protection to equipment and persons under fault conditions. The sensing circuit of the invention may be either single-phase or three-phase. The device transforms the primary current of the circuit being protected and the transformed alternating current (AC) is rectified to a proportional DC voltage at a workable level suitable for the remainder of the over-current protection circuitry. A current transformer steps down the operating voltage of the primary circuit, and a load resistor provides a proportional working voltage for the over-current device appropriate for solid-state circuitry.

The preferred embodiment of the invention may be used as a relatively low-cost substitute in locations where fuse characteristics are advantageous but fuse replacement is not. For instance, the present invention could be used in remote locations where the remote operation of equipment is desirable, such as unmanned facilities where it would be extremely costly to dispatch a repair team for a simple fuse replacement. The device will reset automatically and allow for resumption of operations without the need for dispatching a repair team to the remote location. The self-protection circuitry incorporated in the low-cost over-current device ensures that the device is not destroyed during the act of protecting the primary circuit.

DETAILED DESCRIPTION OF THE PREFERRED EMBODIMENTS OF THE INVENTION

Figure 1:
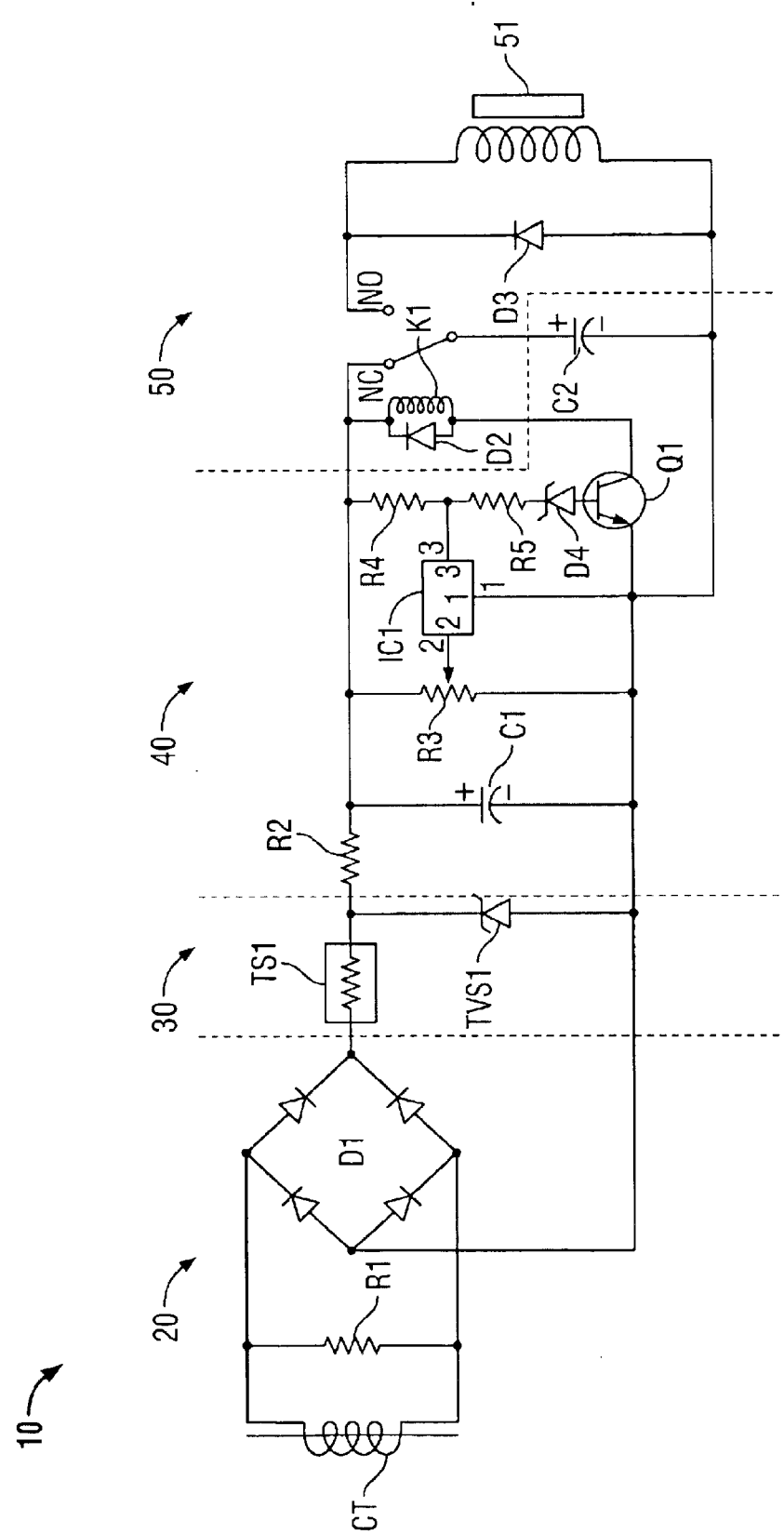
FIG. 1 is a schematic diagram of a single-phase over-current control circuit according to the present invention.

One exemplary embodiment of the present invention is a single-phase over-current control device 10 for providing protection to equipment and person under fault conditions. (See FIG. 1) This embodiment comprises: a single-phase sensing circuit 20; a self-protection circuit 30; a time/current characteristics circuit 35; a minimum trip level circuit 40; and a tripping circuit 50.

The single-phase sensing circuit 20 senses the current characteristics of a monitored circuit or component and translates these current characteristics into an equivalent proportional direct current input to the remainder of the sub-circuits. The self-protection circuit 30 provides both over-current and over-voltage protection to the over-current control device 10 itself.

The time/current characteristic circuitry 35 simulates the time-to-melt and reset-time functions of traditional fuse devices and circuit breakers. When the over-current threshold for the monitored circuit or component is exceeded, the minimum trip level circuitry 40 causes the contacts of a relay to transition, thereby actuating a magnetic latch to protect the monitored circuit or component from an over-current condition. The magnetic latch may actuate a tripping device itself or may be integrated with other devices to accomplish de-energization and/or alarms as required by each unique installation.

The single-phase sensing circuit 20 comprises current transformer CT, load resistor R1 and bridge rectifier D1. Current transformer CT converts the primary current, flow through the device 10 into a lower-level current flow dependent on the ratio of the windings of current transformer CT. Load resistor R1 converts the secondary current flow from the current transformer CT into a voltage proportional to the primary current. Bridge rectifier D1 converts the AC voltage and current into a DC voltage and current proportional to the primary voltage and current.

Self-protection circuit 30 comprises thermal switch TS1 and transient voltage suppressor TVS1. Thermal switch TS1 and transient voltage suppressor TVS1 are commercially available items. A Bourns model MF-R010 is representative of a device that could be employed as thermal switch TS1, and transient voltage suppressor TVS1 could be a common zener diode. Thermal switch TS1 interrupts the flow of current by a rapid change in resistance if the current through device 10 exceeds the trip current level of thermal switch TS1. Transient voltage suppressor TVS1 changes from a very high resistance to a very low resistance if the voltage across it exceeds a specified breakdown voltage.

When the voltage across transient voltage suppressor TVS1 exceeds its breakdown voltage, transient voltage suppressor TVS1 creates a low resistance path to ground, preventing the voltage in the circuit from rising. This low-resistance path to ground causes a current flow exceeding the trip level of thermal switch TS1. This high current flow causes thermal switch TS1 to operate, interrupting the flow of the current to the protected circuit, and shutting off over-current control 10. The self-protection circuit 30, however, will self-reset as soon as the voltage applied to over-current control 10 drops below the breakdown voltage of transient voltage suppressor TVS1. Likewise, thermal switch TS1 will reset once the high current flow causing thermal switch TS1 to trip is removed.

The time/current characteristic sub-circuit of the time/current characteristic circuit 40 comprises resistor R2 and resistor R3 and capacitor C1 and capacitor C2. Resistor R2 controls the rate of charge of capacitors C1 and C2, while resistor R3 controls the rate of discharge. The time-rate of the voltage increase on the capacitors creates the time/current characteristic of the circuit and simulates the time-to-melt aspects of a fuse. Resistor R3 discharges the voltage on the capacitor with time/current characteristics similar to a circuit breaker cooling down after the removal of load current.

The minimum trip level sub-circuit 35 comprises adjustable resistor R3, voltage monitor IC1, resistor R4 and resistor R5 and transistor Q1. A voltage monitor IC1, such as a Bourns model ZM33164, is a device that has an output at Pin 3 that transitions from low to high when the input voltage at Pin 2 reaches a specified threshold. The voltage on the input of voltage monitor IC1 is controlled by resistor R3 acting as a voltage divider between the positive DC level and ground. When the transition occurs, the output of voltage monitor IC1 goes high and the current is allowed to flow through resistor R4 and resistor R5 to the base of transistor Q1. When the above-mentioned current flows to the base of transistor Q1, it turns on, allowing current to flow from the collector to the emitter of transistor Q1.

The output of voltage monitor IC1 is normally held low when the input is below the transition voltage. This causes the current through resistor R4 to flow to ground through voltage monitor IC1, preventing transistor Q1 from turning on. Resistor R5 prevents sufficient current from voltage monitor IC1 from reaching the base of transistor Q1 to turn the transistor on.

Since the current transformer CT and load resistor R1 have tolerances associated with them, resistor R3 is provided as a fine adjustment to set the transition point to correspond to the minimum trip current flowing through the primary of the current transformer CT. Resistor R3 could be replaced with two fixed value resistors if a wider tolerance on the minimum trip setting is acceptable.

Trip circuit 50 comprises transistor Q1, relay K1, capacitor C1, capacitor C2, diode D2, diode D3 and magnetic latch 51. When transistor Q1 turns on, current flows through relay K1 and transistor Q1 to ground. This causes the contacts of relay K1 to actuate, discharging capacitor C2 into magnetic latch 51. Capacitor C2 has sufficient energy stored to cause magnetic latch 51 to actuate and trip open the protected circuit. Capacitor C1 stores sufficient energy to actuate relay K1 for a long enough period of time to allow capacitor C2 to discharge into magnetic latch 51. Diodes D2 and D3 protect the circuit from over-voltages developed by the inductance of relay K1 and magnetic latch 51 when the current flow through them is interrupted.

Another exemplary embodiment of the present invention is a three-phase over-current control device for providing protection to equipment and persons under fault conditions. (See FIG. 2) This embodiment comprises a three-phase sensing circuit plus the same self-protection, time/current characteristic, minimum trip level and tripping circuits as the single-phase embodiment of FIG. 1, discussed supra.

Three-phase sensing circuit 120 comprises three-phase current transformer CT, load resistor R1A, load resistor R1B, load resistor R1C, diode D1A, diode D1B and diode D1C. Current transformer CT converts the primary current flow through the device into a lower level current flow dependent on the ratio of the windings of current transformer CT. Load resistor R1A, load resistor R1B, and load resistor R1C convert the secondary current flow of each phase of current transformer CT into an AC voltage proportional to the primary current. Diode D1A, diode D1B and diode D1C convert the AC voltage into a DC voltage proportional to the primary current.

Figure 2:
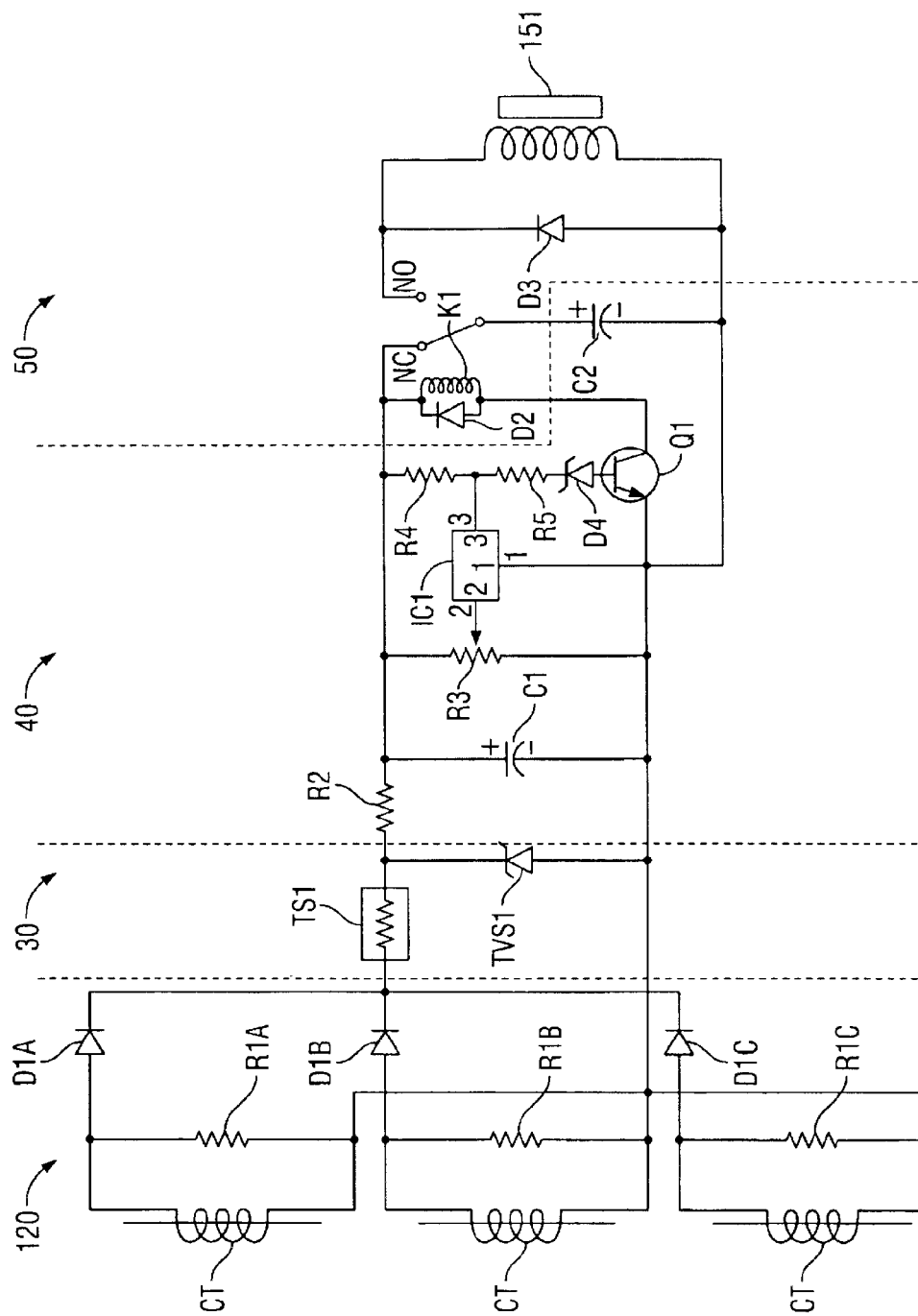
FIG. 2 is a schematic diagram of a three-phase over-current control circuit according to the present invention.

The resulting rectified voltage is then applied to the sub-circuits 30, 35, 40 and 50 which function exactly as described in connection with FIG. 1.

It will be apparent to those skilled in the art that changes and modifications may be made in the embodiments illustrated herein, without departing from the spirit and the scope of the invention. Thus, the invention is not to be limited to the particular described except insofar as indicated by the scope of the appended claims.

What is claimed is:

1. An over-current control device comprising:

a step-down transformer;

a rectifier for rectifying the output of the transformer;

a time/current characteristic circuit wherein the time rate of voltage increase and decrease simulates the thermal characteristics of the time-to-melt in a fuse element and the time-to-reset in a circuit breaker, said time/current characteristic circuit being connected to the output of the rectifier;

a minimum trip level circuit responsive to said time/current characteristic circuit and comprising a voltage-monitoring integrated circuit chip and a first switching device, wherein said integrated circuit chip transitions from a low output state to a high output state based on a threshold voltage level sensed at the input of the integrated circuit chip, thereby controlling said switching device; and a tripping circuit responsive to said minimum trip level circuit and comprising a second switching device, stored energy means and a latching relay, wherein said latching relay is controlled by said second switching device and is powered by said stored energy.

2. A device as in claim 1 wherein said minimum trip level circuit further comprises means for trip point tuning.

3. A device according to claim 1 further comprising a self-protection circuit comprising a means for interrupting the flow of current if the current through said over-current device exceeds the trip current threshold of the circuit, and a means for removing the supply voltage from said over-current device if said supply voltage exceeds a selected threshold.

4. A three-phase over-current control device as in claim 1 wherein said step-down transformer comprises three single-phase step-down transformers connected in parallel.

* * * * *